(12) United States Patent
Cuttino

(10) Patent No.: US 11,029,235 B2
(45) Date of Patent: *Jun. 8, 2021

(54) PRECISION MOTION MECHANISM FOR EXAMINING TIRE PERFORMANCE UNDER PRECISE DISPLACEMENT OR SLOW RATE CONDITIONS

(71) Applicant: James F. Cuttino, Huntersville, NC (US)

(72) Inventor: James F. Cuttino, Huntersville, NC (US)

(73) Assignee: Link Engineering Company, Plymouth, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/281,249

(22) Filed: Feb. 21, 2019

(65) Prior Publication Data
US 2020/0056963 A1 Feb. 20, 2020

Related U.S. Application Data

(60) Provisional application No. 62/633,721, filed on Feb. 22, 2018.

(51) Int. Cl.
*G01M 17/02* (2006.01)
(52) U.S. Cl.
CPC ................... *G01M 17/021* (2013.01)
(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 4,658,656 A * | 4/1987 | Haeg | G01M 13/027 73/669 |
|---|---|---|---|
| 8,474,311 B2 * | 7/2013 | Cuttino | G01M 17/021 73/146 |

(Continued)

FOREIGN PATENT DOCUMENTS

| GB | 2544299 A | 5/2017 |
|---|---|---|
| JP | 2001221716 A | 8/2001 |

OTHER PUBLICATIONS

Nov. 7, 2019 European Search Report issued on International Application No. 19171500.

*Primary Examiner* — Andre J Allen
(74) *Attorney, Agent, or Firm* — Clements Bernard Walker; Christopher L. Bernard

(57) ABSTRACT

A tire testing assembly adapted to provide precise displacements and simulate slow rate conditions, the tire testing assembly including: a support structure adapted to be coupled to a tire under test; a ground plane adapted to contact the tire under test and simulate a ground or road surface; and a lateral translation mechanism movably coupled between the support structure and the tire under test and adapted to translate the tire under test laterally relative to the ground plane. The tire testing assembly also includes a steering frame pivotably coupled between the support structure and the tire under test and adapted to pivot the tire under test about a steer axis of rotation relative to the ground plane. The tire testing assembly further includes a longitudinal translation mechanism movably coupled between the support structure and the tire under test and adapted to translate the tire under test longitudinally relative to the ground plane.

18 Claims, 4 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/20; B60C 11/246; B60C 23/0486; B60C 23/06; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | | |
|---|---|---|---|---|
| 9,038,449 B2* | 5/2015 | Cuttino | .................. | G01M 17/02 73/146 |
| 2013/0068006 A1* | 3/2013 | Cuttino | .................. | G01M 17/02 73/118.01 |
| 2014/0090461 A1 | 4/2014 | Cuttino | | |

* cited by examiner

Degrees of Freedom of the Slow Rate Condition Tire Testing Assembly

- Lateral to Tire (Slideway Actuator)
- Longitudinal to Tire (Slideway Actuator)
- Tire Rotation (Rotational Actuator)
- Tire Steering (Pivot Actuator)
- Vertical to Tire (Slideway Actuator)
- Tire Camber (Pivot Actuator)

*FIG. 4*

PRECISION MOTION MECHANISM FOR EXAMINING TIRE PERFORMANCE UNDER PRECISE DISPLACEMENT OR SLOW RATE CONDITIONS

CROSS-REFERENCE TO RELATED APPLICATION

The present patent application/patent claims the benefit of priority of U.S. Provisional Patent Application No. 62/633,721, filed on Feb. 22, 2018, and entitled "Precision Motion Mechanism for Examining Tire Performance Under Precise Displacement or Slow Rate Conditions," the contents of which are incorporated in full by reference herein.

FIELD OF THE INVENTION

The present invention relates generally to the automotive field. More specifically, the present invention relates to a precision motion mechanism for examining tire performance under precise displacement or slow rate conditions, such as during a parking or low-speed steering maneuver.

BACKGROUND ART

Automotive engineers typically begin designing suspensions and steering systems in a vehicle years before that vehicle goes to market, and components are likewise ordered well in advance to allow suppliers sufficient time to ready their facilities for production. It is therefore important that the automotive engineers have as much information as possible about the various components that will be used in the vehicle as early in the design process as possible.

One such example is the design of steering systems. Power steering systems assist the driver in steering the vehicle, particularly when significant forces on the tire resist steering inputs. Surprisingly, the forces in a steering system are typically maximized during very slow or zero velocity conditions, such as when parking. In a worst-case scenario, a driver will apply the brakes while turning the steering wheel and when the vehicle is not rolling. The complex kinematics of the steering system means that this action results in both the twisting and the dragging the tire on and along the pavement, resulting in the highest reaction forces seen under typical conditions.

The kinematics of the steering system have a tremendous effect on the orientation of the tire during a steering event and greatly complicate the generation of forces in the steering linkages. As illustrated in FIG. 1, the spindle holding the tire rotates about a virtual steering axis. The steering axis forms an angle with the ground in the lateral direction (referred to as the Kingpin Inclination Angle). In addition, it leans backwards at the top, forming a Caster Angle. To further complicate things, the axle upon which the tire rests is often offset from the steering axis (e).

The position and orientation of this steering axis can also be dynamic when the tire is translated up and into the vehicle wheel well (during jounce) or down and away from the vehicle (during rebound). Some newer suspensions also utilize a double ball joint suspension, which moves the steering axis when the wheels are steered. These geometric considerations have many benefits to the vehicle operating at speed, but also result in complex force generation during a parking event, for example. In one extreme motion, a sharp left turn results in the top of the front left tire leaning very far out from the vehicle, while it also pushes the tire into the ground, effectively increasing the vertical load on the left front and decreasing the vertical load on the right front tires.

Whereas it is somewhat straightforward to predict where the mechanical components of the suspension will move under various conditions, it is quite difficult to predict how the tire will react and what resulting forces will be generated under these conditions. These resulting forces have a significant impact on the amount of power assist that is required to provide comfort to the driver.

Further, the importance of these steering forces has increased in recent years due to the replacement of hydraulic power steering pumps with electric assist power steering. The new electric assist devices are more efficient, require less maintenance, and reduce system complexity. However, whereas the hydraulic pumps could handle significant loads in small packages, the electric pumps provide different challenges. The price of the electric motor is highly dependent on the torque required; therefore, specifying a motor with a higher torque than necessary can have significant financial implications on the cost of a vehicle. By the same token, too small a motor results in customer complaints and warranty claims.

Tire testing machines are common, and are intended to provide automotive engineers with tire performance data in the lab prior to having an actual suspension built. However, these machines are typically very limited in their degrees of freedom.

SUMMARY

Thus, the present invention specifies a machine that has additional and sufficient degrees of freedom to replicate the complex motions of the steering systems described above. While it would be impossible to build a machine with the exact steer angles of every vehicle scenario, the solution presented is a machine containing linear and rotary degrees of freedom that, through proper kinematic analysis, can provide the exact orientation and loading that any suspension geometry can offer. This tool will allow the automotive engineer to test various suspension designs with specific tire geometries to predict the exact steering forces that will be generated long before the actual prototype suspension has been fabricated.

In one exemplary embodiment, the present invention provides a tire testing assembly adapted to provide precise displacements and simulate slow rate conditions, the tire testing assembly including: a support structure adapted to be coupled to a tire under test; a ground plane adapted to contact the tire under test and simulate a ground or road surface; and a lateral translation mechanism movably coupled between the support structure and the tire under test and adapted to translate the tire under test laterally relative to the ground plane. The tire testing assembly also includes a steering frame pivotably coupled between the support structure and the tire under test and adapted to pivot the tire under test about a steer axis of rotation relative to the ground plane. The tire testing assembly further includes a longitudinal translation mechanism movably coupled between the support structure and the tire under test and adapted to translate the tire under test longitudinally relative to the ground plane. Optionally, the longitudinal translation mechanism is adapted to translate the ground plane longitudinally relative to both the tire under test and the support structure. The tire testing assembly further includes a wheel hub rotatably coupled between the support structure and the tire under test and adapted to rotate the tire under test relative to the ground plane. The tire testing assembly further includes a vertical translation mechanism movably coupled between the support structure and the tire under test and adapted to translate the tire under test vertically relative to the ground plane. The tire testing assembly further includes a camber pivot pivotably coupled between the support structure and the tire under test and adapted to pivot the tire under test relative to the ground plane. The tire testing assembly further includes a controller operable for controlling motion of the tire under test in any or all degrees of freedom based on one or more input instructions. The tire testing assembly further includes one or more feedback sensors operable for measuring resultant forces experienced by the tire under test when motion is provided in any or all degrees of freedom.

In another exemplary embodiment, the present invention provides a tire testing method for providing precise displacements and simulating slow rate conditions, the tire testing method including: providing a support structure adapted to be coupled to a tire under test; providing a ground plane adapted to contact the tire under test and simulate a ground or road surface; and providing a lateral translation mechanism movably coupled between the support structure and the tire under test and adapted to translate the tire under test laterally relative to the ground plane. The tire testing method also includes providing a steering frame pivotably coupled between the support structure and the tire under test and adapted to pivot the tire under test about a steer axis of rotation relative to the ground plane. The tire testing method further includes providing a longitudinal translation mechanism movably coupled between the support structure and the tire under test and adapted to translate the tire under test longitudinally relative to the ground plane. Optionally, the longitudinal translation mechanism is adapted to translate the ground plane longitudinally relative to both the tire under test and the support structure. The tire testing method further includes providing a wheel hub rotatably coupled between the support structure and the tire under test and adapted to rotate the tire under test relative to the ground plane. The tire testing method further includes providing a vertical translation mechanism movably coupled between the support structure and the tire under test and adapted to translate the tire under test vertically relative to the ground plane. The tire testing method further includes providing a camber pivot pivotably coupled between the support structure and the tire under test and adapted to pivot the tire under test relative to the ground plane. The tire testing method further includes providing a controller operable for controlling motion of the tire under test in any or all degrees of freedom based on one or more input instructions. The tire testing method further includes providing one or more feedback sensors operable for measuring resultant forces experienced by the tire under test when motion is provided in any or all degrees of freedom.

BRIEF DESCRIPTION OF THE DRAWINGS

The present invention is illustrated and described herein with reference to the various drawings, in which like reference numbers are used to denote like assembly components/method steps, as appropriate, and in which:

FIG. 4 is a schematic diagram illustrating one exemplary embodiment of the slow rate condition tire testing method of the present invention.

DESCRIPTION OF EMBODIMENTS

Again, the present invention specifies a machine that has additional and sufficient degrees of freedom to replicate the complex motions of the steering systems described above. While it would be impossible to build a machine with the exact steer angles of every vehicle scenario, the solution presented is a machine containing linear and rotary degrees of freedom that, through proper kinematic analysis, can provide the exact orientation and loading that any suspension geometry can offer. This tool will allow the automotive engineer to test various suspension designs with specific tire geometries to predict the exact steering forces that will be generated long before the actual prototype suspension has been fabricated.

Figure 1:
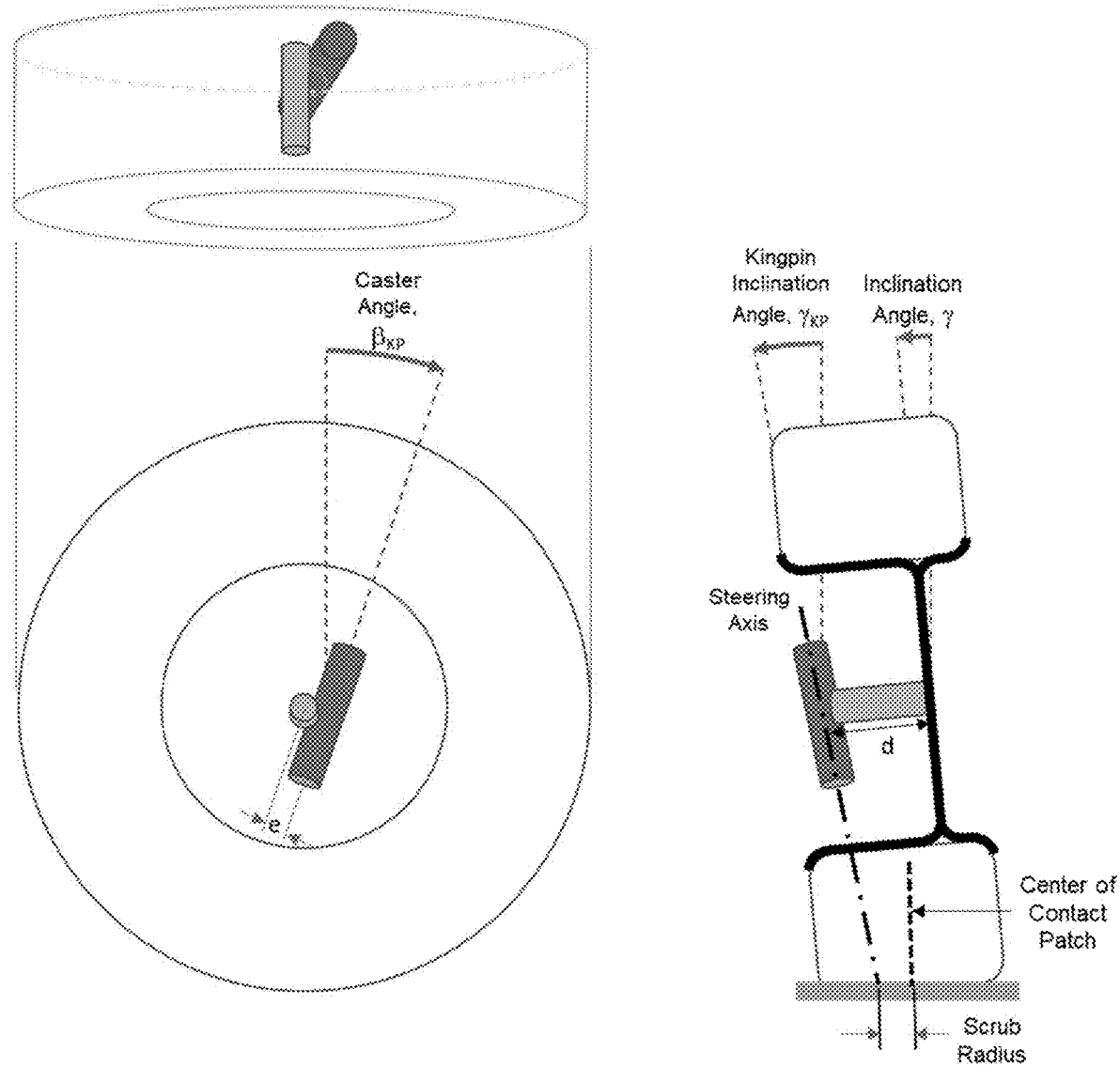
FIG. 1 is a schematic diagram illustrating the tire kinematics associated with a steering maneuver, such as a low speed or stationary steering maneuver.
Figure 2:
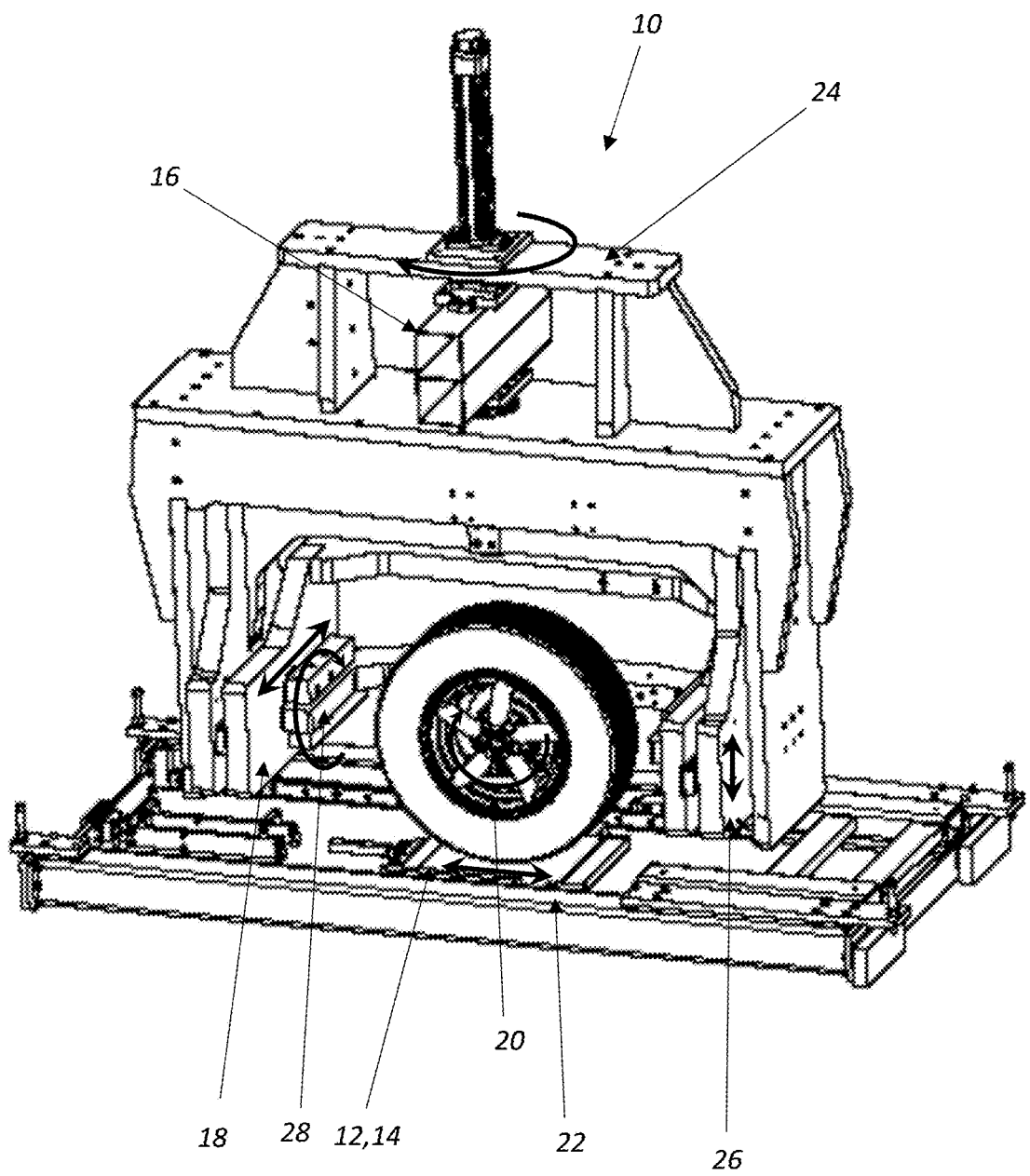
FIG. 2 is a schematic diagram illustrating one exemplary embodiment of the slow rate condition tire testing assembly of the present invention.
Figure 3:
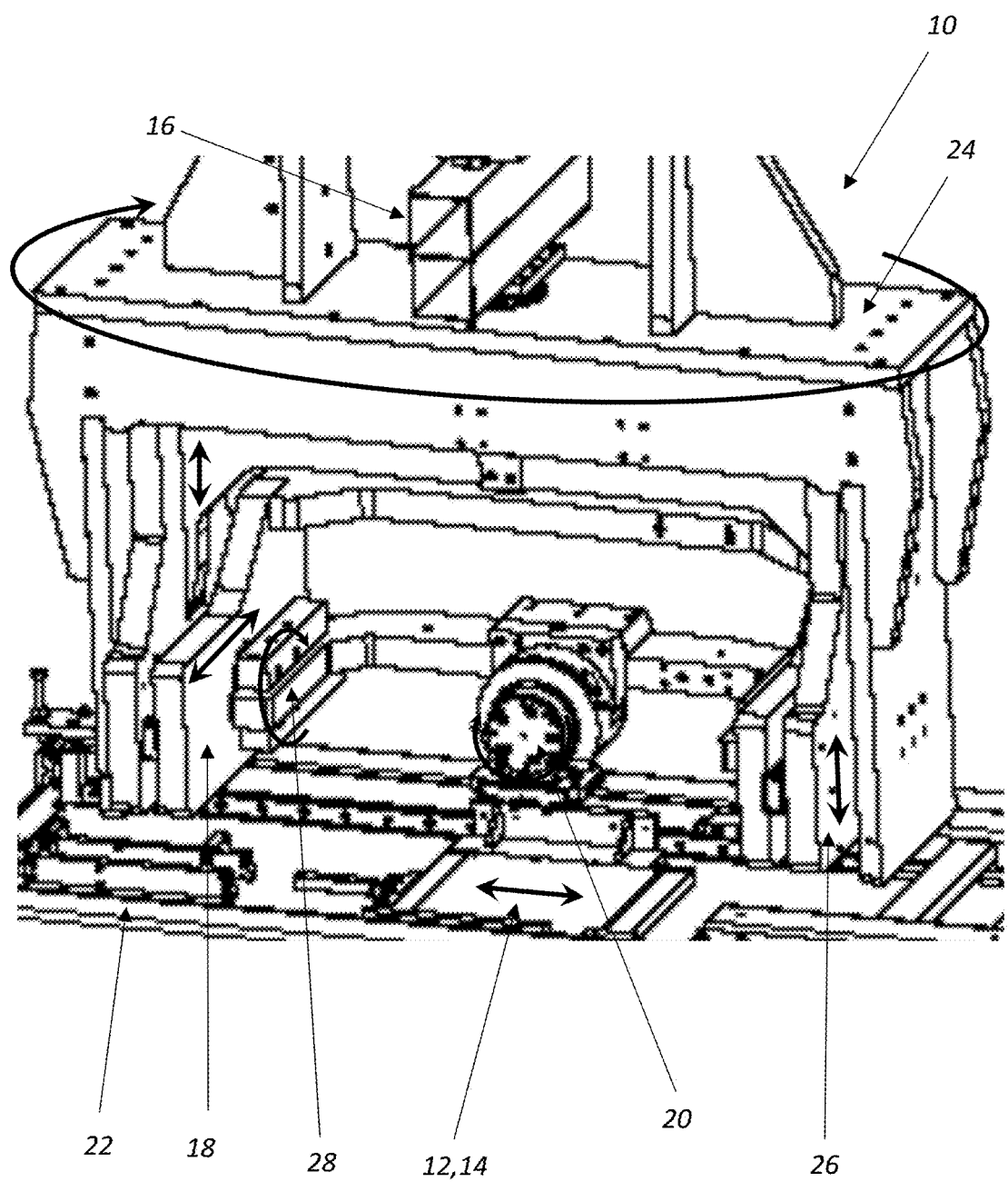
FIG. 3 is another schematic diagram illustrating one exemplary embodiment of the slow rate condition tire testing assembly of the present invention.

Referring now specifically to FIGS. 2 and 3, in one exemplary embodiment, the present invention provides a precision motion assembly 10 that can provide relative motion of a tire (not illustrated) and ground plane 12 in multiple directions in order to simulate tire behavior on a vehicle (not illustrated), particularly, for example, during parking and other slow rate events. The mechanism 10 provides relative motion of the ground plane 12 of the tire in the longitudinal (straight ahead) direction, and/or the lateral (side to side) direction, and/or the vertical direction, and/or any of the associated rotational directions, to simulate the orientation and loading of the tire on the vehicle.

As is illustrated, various retention structures and appropriate actuators (not illustrated) are coupled to a support structure 16 to provide the various degrees of freedom and motion or rotation of the tire. First, lateral translation of the tire with respect to the ground plane 12 is provided by a lateral translation mechanism 18 movably coupled to the support structure 16 and the tire. This lateral translation mechanism 18 consists of a slider mechanism or the like movably coupled to the support structure 16 and the wheel hub 20 and is operable for analyzing scrub radius of the tire, for example. Second, longitudinal translation of the tire with respect to the ground plane 12 is provided by a longitudinal translation mechanism 22 movably coupled to the support structure 16 and the wheel hub 20 carrying the test tire. This longitudinal translation mechanism 22 consists of a slideway or the like movably coupled to the support structure 16 and the ground plane 12 and is operable for analyzing dynamic kingpin inclination angle of the tire, for example, such as with a double ball joint suspension and/or during jounce and rebound. Third, rotation of the tire (forwards or backwards) is provided by the wheel hub 20, which is rotatably coupled to the support structure. The wheel hub 20 is also operable for exactly replicating and analyzing kingpin inclination angle of the tire. For example, the tire can be rotated backwards when the wheel is turned to the right. Fourth, steering of the tire is provided by a steering frame 24 pivotably coupled to the support structure 16 or the tire. This steering frame 24 is operable for analyzing numerous tire conditions and characteristics. Fifth, vertical translation of the tire with respect to the ground plane 12 is provided by a vertical translation mechanism 26 movably coupled to the support structure 16 and the tire. This vertical translation mechanism 26 consists of a slider mechanism or the like movably coupled to the support structure 16 and the wheel hub 20 and is operable for analyzing jounce and rebound, for example. Sixth, a camber pivot 28 is provided for cambering the tire with respect to the ground plane 12.

Thus, in one embodiment, a degree of freedom in the lateral direction can be utilized to translate the tire in the lateral direction, thereby providing a scrub radius for the tire representative of the scrub radius of a vehicle suspension.

Further, and importantly, a precision slideway 22 with its free degree of freedom in the longitudinal direction is mounted on the support structure 16, or on top of a conventional force and moment machine (belt machine, drum, or other), with a precision actuator. The tire is loaded against the slideway, which is then translated with precision to replicate the tire dragging in the longitudinal direction, while, for instance, all forces and moments generated by the tire are acquired.

The tire may be rotated about an axis that may or may not be about the tire's center of contact, this representing steer of a vehicle. The tire may also be inclined relative to the simulated road surface to replicate the motion of a tire as it cambers, including for the inclining motion experienced due to a static or dynamic kingpin axis.

Again, the motion of a double ball joint or other "virtual center" suspension member resulting in a static or a dynamic kingpin inclination angle can be replicated using any and/or all of the available degrees of freedom.

The tire may be rotated about its axis to replicate a braked tire while the spindle is rotated due to the steering kinematics.

The tire may be braked or partially braked to replicate a partial sliding tire, such as when a vehicle is being parallel parked. The machine 10 may be operated in a force-feedback mode, providing the required steer, camber, braking, or other displacement or input required to meet a force target. For example, to provide the minimum amount of braking to achieve a specified longitudinal force. The machine 10 may also be configured to accept either defined geometric descriptions of inputs or a playback drive file that replicates motions not defined by geometric functions (such as those experienced by a vehicle in operation). All or any of these exemplary embodiments can be used to replicate complex tire motions, including those experienced during a braked or partially braked parking forces test, where the tire motion is complex due to a static or dynamic kingpin inclination angle.

The longitudinal slideway 22 provides precise movement in the longitudinal degree of freedom for the purpose of determining longitudinal stiffness or rotational stiffness or other stiffness of the tire under the various orientations generated by the complex steering kinematics. The lateral slideway 18 provides precise movement in the lateral degree of freedom for the purpose of determining lateral stiffness or rotational stiffness or other stiffness of the tire under the various orientations generated by the complex steering kinematics. The vertical slideway 26 provides precise movement in the vertical degree of freedom for the purpose of determining vertical stiffness or rotational stiffness or other stiffness of the tire under the various orientations generated by the complex steering kinematics. The steering axis provides precise movement in the steering degree of freedom for the purpose of determining steering stiffness or rotational stiffness or other stiffness of the tire under the various orientations generated by the complex steering kinematics. Similarly, the wheel hub axis provides precise movement about the axis of the wheel for the purpose of determining torsional stiffness of the tire.

FIG. 4 is a schematic diagram illustrating one exemplary embodiment of the slow rate condition tire testing method of the present invention. Again, as is illustrated, various retention structures and appropriate actuators (not illustrated) are coupled to a support structure 16 to provide the various degrees of freedom and motion or rotation of the tire. First, lateral translation of the tire with respect to the rotational axis of the machine 24 is provided by a lateral translation mechanism 18 movably coupled to the support structure 16 and the tire. This lateral translation mechanism 18 consists of a slider mechanism or the like movably coupled to the support structure 16 and the wheel hub 20 and is operable for analyzing scrub radius of the tire, for example. Second, longitudinal translation of the tire with respect to the ground plane 12 is provided by a longitudinal translation mechanism 22 movably coupled to the support structure 16 and the ground plane 12. This longitudinal translation mechanism 22 consists of a slideway or the like movably coupled to the support structure 16 and the ground plane 12 and is operable for analyzing dynamic kingpin inclination angle of the tire, for example, such as with a double ball joint suspension and/or during jounce and rebound. Third, rotation of the tire (forwards or backwards) is provided by the wheel hub 20, which is rotatably coupled to the support structure. The wheel hub 20 is also operable for exactly replicating and analyzing kingpin inclination angle of the tire. For example, the tire can be rotated backwards when the wheel is turned to the right. Fourth, steering of the tire is provided by a steering frame 24 pivotably coupled to the support structure 16 or the tire. This steering frame 24 is operable for analyzing numerous tire conditions and characteristics. Fifth, vertical translation of the tire with respect to the ground plane 12 is provided by a vertical translation mechanism 26 movably coupled to the support structure 16 and the tire. This vertical translation mechanism 26 consists of a slider mechanism or the like movably coupled to the support structure 16 and the wheel hub 20 and is operable for analyzing jounce and rebound, for example. Sixth, a camber pivot 28 is provided for cambering the tire with respect to the ground plane 12.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A tire testing assembly adapted to provide precise displacements and simulate slow rate conditions, the tire testing assembly comprising:
   a support structure adapted to be coupled to a tire under test;
   a ground plane adapted to contact the tire under test and simulate a ground or road surface; and
   a lateral translation mechanism movably coupled between the support structure and the tire under test and adapted to translate the tire under test laterally relative to the ground plane.

2. The tire testing assembly of claim 1, further comprising a steering frame pivotably coupled between the support structure and the tire under test and adapted to pivot the tire under test about a steer axis of rotation relative to the ground plane.

3. The tire testing assembly of claim 1, further comprising a longitudinal translation mechanism movably coupled between the support structure and the tire under test and adapted to translate the tire under test longitudinally relative to the ground plane.

4. The tire testing assembly of claim 3, wherein the longitudinal translation mechanism is adapted to translate the ground plane longitudinally relative to both the tire under test and the support structure.

5. The tire testing assembly of claim 1, further comprising a wheel hub rotatably coupled between the support structure and the tire under test and adapted to rotate the tire under test relative to the ground plane.

6. The tire testing assembly of claim 1, further comprising a vertical translation mechanism movably coupled between the support structure and the tire under test and adapted to translate the tire under test vertically relative to the ground plane.

7. The tire testing assembly of claim 1, further comprising a camber pivot pivotably coupled between the support structure and the tire under test and adapted to pivot the tire under test relative to the ground plane.

8. The tire testing assembly of claim 1, further comprising a controller operable for controlling motion of the tire under test in any or all degrees of freedom based on one or more input instructions.

9. The tire testing assembly of claim 1, further comprising one or more feedback sensors operable for measuring resultant forces experienced by the tire under test when motion is provided in any or all degrees of freedom.

10. A tire testing method for providing precise displacements and simulating slow rate conditions, the tire testing method comprising:
    providing a support structure adapted to be coupled to a tire under test;
    providing a ground plane adapted to contact the tire under test and simulate a ground or road surface; and
    providing a lateral translation mechanism movably coupled between the support structure and the tire under test and adapted to translate the tire under test laterally relative to the ground plane.

11. The tire testing method of claim 10, further comprising providing a steering frame pivotably coupled between the support structure and the tire under test and adapted to pivot the tire under test about a steer axis of rotation relative to the ground plane.

12. The tire testing method of claim 10, further comprising providing a longitudinal translation mechanism movably coupled between the support structure and the tire under test and adapted to translate the tire under test longitudinally relative to the ground plane.

13. The tire testing method of claim 12, wherein the longitudinal translation mechanism is adapted to translate the ground plane longitudinally relative to both the tire under test and the support structure.

14. The tire testing method of claim 10, further comprising providing a wheel hub rotatably coupled between the support structure and the tire under test and adapted to rotate the tire under test relative to the ground plane.

15. The tire testing method of claim 10, further comprising providing a vertical translation mechanism movably coupled between the support structure and the tire under test and adapted to translate the tire under test vertically relative to the ground plane.

16. The tire testing method of claim 10, further comprising providing a camber pivot pivotably coupled between the support structure and the tire under test and adapted to pivot the tire under test relative to the ground plane.

17. The tire testing method of claim 10, further comprising providing a controller operable for controlling motion of the tire under test in any or all degrees of freedom based on one or more input instructions.

18. The tire testing method of claim 10, further comprising providing one or more feedback sensors operable for measuring resultant forces experienced by the tire under test when motion is provided in any or all degrees of freedom.

* * * * *